(12) United States Patent
Sikkema et al.

(10) Patent No.: US 6,372,831 B1
(45) Date of Patent: Apr. 16, 2002

(54) FLAME RESISTANT RUBBER MODIFIED POLYMER COMPOSITIONS

(75) Inventors: Kevin D. Sikkema, Hulst (NL); Dawn M. Orbeck; Robert G. Nelb, II, both of Midland, MI (US)

(73) Assignee: The Dow Chemical Company, Midland, MI (US)

( * ) Notice: Subject to any disclaimer, the term of this patent is extended or adjusted under 35 U.S.C. 154(b) by 787 days.

(21) Appl. No.: 08/659,554

(22) Filed: Jun. 6, 1996

Related U.S. Application Data

(60) Provisional application No. 60/006,703, filed on Nov. 14, 1995.

(51) Int. Cl.$^7$ ................................................. C08K 5/06
(52) U.S. Cl. ........................ 524/371; 524/411; 524/412
(58) Field of Search ................................ 524/144, 371, 524/341, 411, 412, 94; 525/71

(56) References Cited

U.S. PATENT DOCUMENTS

| | | | |
|---|---|---|---|
| 4,031,166 A | | 6/1977 | Bronstert et al. |
| 4,219,466 A | | 8/1980 | Yoshida et al. |
| 4,301,058 A | * | 11/1981 | Neukirchen et al. ........ 524/577 |
| 5,334,657 A | * | 8/1994 | Swartzmiller et al. ........ 525/71 |
| 5,387,636 A | | 2/1995 | Landry et al. |

FOREIGN PATENT DOCUMENTS

| | | |
|---|---|---|
| WO | WO 81-01006 | 4/1981 |

\* cited by examiner

*Primary Examiner*—Veronica P. Hoke

(57) ABSTRACT

The present invention is an flame resistant resin composition comprising:

- A) from about 50 to about 90 parts by weight of a rubber modified polymer derived from a vinyl aromatic monomer,
- B) from about 1 to about 8 parts by weight of an impact modifier,
- C) from about 0.5 to about 5 parts by weight of a polyolefin having a density of greater than 0.940 g/cm$^3$ and a melt flow rate of less than 4 as measured according to ASTM D1238 at 190° C. using a 2.16 kg weight,
- D) a sufficient amount of a halogen-containing flame retardant to provide the composition with 7 to 14 parts by weight halogen, and
- E) from about 2 to about 6 parts by weight of an inorganic flame retardant synergist.

13 Claims, No Drawings

FLAME RESISTANT RUBBER MODIFIED POLYMER COMPOSITIONS

This application claims the priority of a copending provisional application, Ser. No. 60/006,703 filed on Nov. 14, 1995.

BACKGROUND OF THE INVENTION

This invention relates to flame resistant rubber modified polymer compositions.

Flame resistant resin compositions are often required to have a V-0 flammability rating and a high melt flow rate (MFR), especially in molded parts having areas of very low thickness. To obtain a flammability rating of V-0, a resin must pass certain criteria as described in Subject 94, Underwriters Laboratories Tests For Flammability of Plastic Materials (hereinafter referred to as UL-94). One criteria for obtaining a V-0 rating is the absence of cotton-igniting drips from the sample after it has been exposed to a defined flame. However, high melt flow rate resins are more inclined to drip during UL-94 flammability testing, thus risking a lower flammability rating.

A flame resistant resin composition containing rubber modified polystyrene, styrene-butadiene copolymer, flame retardants and a polyolefin having a melt flow rate of about 5 to about 50, is disclosed in WO 0801006 by Kent et al. This composition has an excellent flammability rating (V-0 using UL-94 flammability test), but melt flow rates of 5.2 or less are reported for the composition.

U.S. Pat. No. 4,219,466, issued to Yoshida et al., discloses resin compositions comprising a rubber modified monovinyl aromatic monomer, styrene-butadiene block copolymer, amorphous alpha-olefin polymer, halide flame retardant and an antimony compound. However, these compositions are shown to obtain flammability ratings of V-1 and V-2 during UL-94 flammability testing, which is undesirable.

Therefore, it remains highly desirable to obtain a high melt flow flame resistant resin composition having a reduced tendency to drip during UL-94 flammability testing.

SUMMARY OF THE INVENTION

The present invention is a flame resistant resin composition comprising:
A) from about 50 to about 90 parts by weight of a rubber modified polymer derived from a vinyl aromatic monomer,
B) from about 1 to about 8 parts by weight of an impact modifier,
C) from about 0.5 to about 5 parts by weight of a polyolefin having a density of greater than 0.940 g/cm³ and a melt flow rate of less than 4 as measured according to ASTM D1238 at 190° C. using a 2.16 kg weight,
D) a sufficient amount of a halogen-containing flame retardant to provide the composition with 7 to 14 parts by weight halogen, and
E) from about 2 to about 6 parts by weight of an inorganic flame retardant synergist.

These polymer compositions are useful in the manufacture of television cabinets and other molded products which require high flow and good flammability properties.

DESCRIPTION OF THE PREFERRED EMBODIMENTS

Component A is a rubber modified vinyl aromatic polymer. Suitable polymers include those made from vinyl aromatic monomers typically represented by the formula:

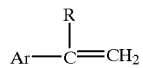

wherein R is hydrogen or methyl, Ar is an aromatic ring structure having from 1 to 3 aromatic rings with or without alkyl, halo, or haloalkyl substitution, wherein any alkyl group contains 1 to 6 carbon atoms and haloalkyl refers to a halogen substituted alkyl group. Preferably, Ar is phenyl or alkylphenyl with phenyl being most preferred. Typical vinyl aromatic monomers which can be used include: styrene, alpha-methylstyrene, all isomers of vinyl toluene, especially para-vinyltoluene, all isomers of ethyl styrene, propyl styrene, vinyl biphenyl, vinyl naphthalene, vinyl anthracene and the like, and mixtures thereof. The vinyl aromatic monomer may also be combined with other copolymerizable monomers. Examples of such monomers include, but are not limited to acrylic monomers such as acrylonitrile, methacrylonitrile, methacrylic acid, methyl methacrylate, acrylic acid, and methyl acrylate, maleic anhydride, maleimide, and phenylmaleimide.

Rubber modified vinyl aromatic polymers can be prepared by polymerizing the vinyl aromatic monomer in the presence of a predissolved rubber to prepare impact modified, or grafted rubber containing products, examples of which are described in U.S. Pat. Nos. 3,123,655, 3,346,520, 3,639,522, and 4,409,369 which are herein incorporated by reference. The rubber is typically a butadiene or isoprene rubber, preferably polybutadiene. Preferably, the rubber modified vinyl aromatic polymer is high impact polystyrene (HIPS) or acrylonitrile-butadiene-styrene (ABS), with HIPS being most preferred.

The amount of rubber modified vinyl aromatic polymer used in the composition of the present invention is typically from about 50 parts by weight, preferably from about 60, more preferably from about 70 and most preferably from about 72 to about 90, preferably to about 88, more preferably to about 85 and most preferably to about 82 parts by weight.

Component B is an impact modifier which can be any polymer which will increase the impact strength of the composition of the present invention. Typical impact modifiers include polybutadiene, polyisoprene, and copolymers of a vinyl aromatic monomer and a conjugated diene, e.g. styrene-butadiene copolymers, styrene-isoprene copolymers, including diblock and triblock copolymers. Other impact modifiers include copolymers of a vinyl aromatic monomer with hydrogenated dienes, ethylene-acrylic acid copolymers and ethylene-styrene copolymers. Preferably, the impact modifier is a styrene-butadiene-styrene triblock copolymer containing from about 25 to about 40 weight percent styrene component.

The amount of impact modifier used in the composition of the present invention is typically from about 1 to about 8 parts by weight, preferably from about 1 to about 7, more preferably from about 2 to about 6, and most preferably from about 2 to about 5 parts by weight.

Component C is a polyolefin having a melt flow rate of less than 4 g/10 min., preferably less than 3, more preferably less than 2, and most preferably less than 1.0 g/10 min., as measured according to ASTM 1238 at 190° C. using a 2.16 kg weight. Typical polyolefins include those produced by polymerizing an olefin containing from 2–5 carbon atoms. Preferably, the polyolefin is a polyethylene or a polypropylene polymer, more preferably a polyethylene, and most preferably a high density polyethylene, e.g. a polyethylene having a density greater than 0.940 g/cm$^3$ including an ethylene homopolymer and copolymers of ethylene with higher alpha olefins, such as 1-octene, 1-hexene, 1-butene, 4-methyl-1-pentene and the like.

The amount of polyolefin used in the composition of the present invention is typically from about 0.5 to about 5 parts by weight, preferably from about 0.8 to about 4.5, more preferably from about 0.8 to about 3, and most preferably from about 0.8 to about 2 parts by weight.

Component D is a flame retardant which can be any halogen-containing compound or mixture of compounds which imparts flame resistance to the composition of the present invention. Suitable flame retardants are well-known in the art and include but are not limited to hexahalodiphenyl ethers, octahalodiphenyl ethers, decahalodiphenyl ethers, decahalobiphenyl ethanes, 1,2-bis(trihalophenoxy)ethanes, 1,2-bis(pentahalophenoxy)ethanes, hexahalocyclododecane, a tetrahalobisphenol-A, ethylene(N, N')-bis-tetrahalophthalimides, tetrahalophthalic anhydrides, hexahalobenzenes, halogenated indanes, halogenated phosphate esters, halogenated paraffins, halogenated polystyrenes, and polymers of halogenated bisphenol-A and epichlorohydrin, or mixtures thereof. Preferably, the flame retardant is a bromine or chlorine containing compound. In a preferred embodiment, the flame retardant is decabromodiphenyl ether or a mixture of decabromodiphenyl ether with tetrabromobisphenol-A.

The amount of flame retardant present within the composition of the present invention will depend upon the halogen content of the specific flame retardant used. Typically, the amount of flame retardant is chosen such that from about 7 to about 14 parts by weight, preferably from about 7 to about 13, more preferably from about 8 to about 12 and most preferably from about 9 to 11 parts by weight halogen is present in the composition of the present invention.

Component E is an inorganic flame retardant synergist which are known in the art as compounds which enhance the effectiveness of flame retardants, especially halogenated flame retardants. Examples of inorganic flame retardant synergists include but are not limited to metal oxides, e.g. iron oxide, tin oxide, zinc oxide, aluminum trioxide, alumina, antimony tri- and pentoxide, bismuth oxide, molybdenum trioxide, and tungsten trioxide, boron compounds such as zinc borate, antimony silicates, ferrocene and mixtures thereof.

The amount of inorganic flame retardant synergist present is typically from about 2 to about 6 parts by weight, preferably from about 2 to about 5, more preferably from about 2.5 to about 5 and most preferably from about 2.5 to about 4 parts by weight.

The compositions of the present invention may also contain minor amounts of typical processing aids such as mold release agents, plasticizers, flow promoters, e.g. waxes or mineral oil, pigments, thermal stabilizers, UV stabilizers, antioxidants, fillers, e.g. glass fibers, glass beads, and the like.

The composition can be produced by any blending or mixing technique which will result in a generally uniform dispersion of all ingredients throughout the resulting product. Illustrative devices include Banbury mixers, compounding rolls, single screw extruders, twin screw extruders, and the like. Additionally, the components of the composition can be combined in an apparatus such as a dry blender before being fed into a mixing/melting extruder apparatus, or two or more of the ingredients may be pre-mixed and fed into a hot melt of the remaining components.

The melt flow rate of the composition of the present invention is typically from about 6 to about 30 g/10 min., preferably from about 7 to about 25, more preferably from about 10 to about 22 and most preferably from about 13 to about 20 g/10 min. as measured according to ASTM D1238 at 200° C. using a 5 kg weight. Typically, high melt flow rate compositions can be prepared by including high melt flow rate HIPS resins within the composition or by including plasticizers such as mineral oil, silicone oil, low molecular weight polystyrene or flame retardants which act as plasticizers, e.g. tetrabromobisphenol A.

The composition of the present invention can be used in injection molding applications to manufacture TV cabinets, computer monitors, printer housings and the like.

Compositions used in such injection molding applications are typically required to have excellent flammability ratings. Flammability ratings are obtained by testing under UL-94 which requires the exposure of a defined test sample of material to a defined flame for a specified period of time. Ratings of V-0, V-1, and V-2 are obtained according to a number of criteria, including flame time, afterglow time, and cotton-igniting drips. One criteria for obtaining a V-0, which is the most desirable rating, is the absence of cotton-igniting drips. Cotton-igniting drips are drips which ignite the cotton placed at a defined distance below the test specimen during testing. However, the occurrence of any drips increases the possibility of igniting the cotton, which could lower the rating to a V-2. Therefore, it would be beneficial to produce a composition having a reduced tendency to drip during UL-94 test procedures. Preferably the composition of the present invention has a reduced tendency to produce cotton-igniting drips, more preferably the composition does not produce any cotton-igniting drips and most preferably, the composition of the present invention does not produce any drips during UL-94 testing.

The tests employed with the materials of this invention are not intended to reflect hazards present by these or any other materials under actual fire conditions.

The following examples are provided to illustrate the present invention. The examples are not intended to limit the scope of the present invention and they should not be so interpreted. Amounts are in weight percentages unless otherwise indicated.

EXAMPLE 1

Styron™ 478, a HIPS resin available from The Dow Chemical Company, decabromodiphenylether, tetrabromobisphenol A, antimony trioxide, Vector™ 8508D, a styrene-butadiene-styrene triblock copolymer available from Dexco Polymers, carbon black concentrate, which is 40 wt. percent carbon black dispersed in 60 wt. percent polyethylene carrier (the polyethylene having a Melt index of 20) and a polyethylene as listed in Table I are tumble blended in polyethylene bags and added as a single feed to a co-rotating 30 mm twin screw mixer, followed by a vented 38 mm single screw extruder. The polymer melt is passed through a 2 hole die and the polymer strands are cooled in a water bath and cut into pellets.

The resins are then injection molded to prepare 5 test specimens. The flammability tests are conducted using 1.6 mm thick test specimens according to the UL-94 Vertical Burn test procedures. Results are listed in Table II.

TABLE I

|  | Control | 2% Polyethylene | 4% Polyethylene |
|---|---|---|---|
| Styron ™ 478 (HIPS) | 78.4 | 76.4 | 74.4 |
| DBDPE (decabromodiphenylether) | 6.0 | 6.0 | 6.0 |
| TBBA (Tetrabromobisphenol A) | 8.6 | 8.6 | 8.6 |
| $Sb_2O_3$ | 3.5 | 3.5 | 3.5 |
| Vector ™ 8508D (SBS) | 2.0 | 2.0 | 2.0 |
| Black Color Concentrate | 1.5 | 1.5 | 1.5 |
| Polyethylene (PE) |  | 2.0* | 4.0* |
| Total | 100 | 100 | 100 |

SBS = styrene-butadiene-styrene (impact modifier)
PE = polyethylene
*The polyethylenes used are identified in Tables II and III.

TABLE II

| | Density (g/cm³) | PE MFR (g/10 min.) | # of Samples with Drips which do not Ignite Cotton | # of Samples with Drips which Ignite Cotton | # of Samples with Zero Drips | Comp. MFR (g/10 min.) |
|---|---|---|---|---|---|---|
| 1*Control PE (2%) | n/a | n/a | 2 | 3 | 0 | 16 |
| 2* LDPE | 0.923 | 35 | 5 | 0 | 0 | 17 |
| 3 HDPE (4%) | 0.965 | 0.9 | 0 | 0 | 5 | 16 |
| 4* LDPE | 0.923 | 35 | 3 | 0 | 2 | 19 |
| 5 HDPE | 0.965 | 0.9 | 0 | 0 | 5 | 15 |

PE MFR = melt flow rate of the polyethylene as measured according to ASTM D1238 at 190° C. using 2.16 kg weight.
Comp. MFR = melt flow rate of the composition as measured according to ASPM D1238 at 200° C. using 5 kg weight.
*Comparative examples
LDPE = low density polyethylene
HDPE = high density polyethylene In compositions 2–5, none of the samples produced cotton igniting, drips. However, all the samples of composition 2 and 3 out of 5 samples of composition 4 produced drips, while the samples of compositions (3 and 5) did not drip at all.

EXAMPLE 2

Additional compositions are made in the same manner as in Example 1 as listed in Table I. Ten samples (1.6 mm thick) of each composition are made by injection molding and are tested for flammability under UL-94 procedures and the results are listed in Table III.

TABLE III

| | Density (g/cm³) | PE MFR (g/10 min.) | # of Samples with Drips which do not Ignite Cotton | # of Samples with Drips which Ignite Cotton | # of Samples with Zero Drips | Comp. MFR (g/10 min.) |
|---|---|---|---|---|---|---|
| PE (2%) | | | | | | |
| A* LDPE | 0.919 | 0.5 | 5 | 0 | 5 | 20 |
| B  LDPE | 0.922 | 2 | 4 | 2 | 4 | 20 |
| C* LDPE | 0.923 | 4.2 | 8 | 1 | 1 | 20 |
| D* LDPE | 0.918 | 12 | 5 | 4 | 1 | 19 |
| E* LDPE | 0.923 | 35 | 2 | 3 | 5 | 18 |
| F  HDPE | 0.96 | 0.32 | 0 | 0 | 10 | 18 |
| G  HDPE | 0.952 | 0.32 | 0 | 0 | 10 | 19 |
| H  HDPE | 0.965 | 0.9 | 0 | 0 | 10 | 19 |
| I* HDPE | 0.952 | 4 | 3 | 4 | 3 | 20 |
| J* HDPE | 0.962 | 10 | 2 | 7 | 1 | 15 |
| K* HDPE | 0.96 | 30 | 2 | 5 | 3 | 19 |
| L* HDPE | 0.953 | 65 | 1 | 6 | 3 | 20 |
| (4%) | | | | | | |
| A* LDPE | 0.919 | 0.5 | 5 | 0 | 5 | 20 |
| B* LDPE | 0.922 | 2 | 7 | 2 | 1 | 20 |
| C* LDPE | 0.923 | 4.2 | 5 | 2 | 3 | 20 |
| D* LDPE | 0.918 | 12 | 5 | 0 | 5 | 22 |
| E* LDPE | 0.923 | 35 | 2 | 2 | 6 | 25 |
| F  HDPE | 0.96 | 0.32 | 0 | 0 | 10 | 16 |
| G  HDPE | 0.952 | 0.32 | 0 | 0 | 10 | 18 |
| H  HDPE | 0.965 | 0.9 | 0 | 0 | 10 | 19 |
| I* HDPE | 0.952 | 4 | 0 | 5 | 5 | 20 |
| J* HDPE | 0.962 | 10 | 4 | 3 | 3 | 21 |
| K* HDPE | 0.96 | 30 | 5 | 3 | 2 | 22 |
| L* HDPE | 0.953 | 65 | 3 | 2 | 5 | 23 |
| CONTROL | n/a | n/a | 4 | 4 | 2 | 20 |

LDPE = low density polyethylene
HDPE = high density polyethylene
PE MFR = melt flow rate of the polyethylene as measured according to ASTM D1238 at 190° C. using 2.16 kg weight.
Comp. MFR = melt flow rate of the composition as measured according to ASTM D1238 at 200° C. using 5 kg weight.
*Comparative examples The samples of compositions containing high density polyethylenes having melt flow rates of less than 4 (F,G & H) produce no drips during flammability testing under UL-04 procedures.

What is claimed is:

1. A flame resistant resin composition comprising:
   A) from about 50 to about 90 parts by weight of a rubber modified polymer derived from a vinyl aromatic monomer,
   B) from about 1 to about 8 parts by weight of an polymeric impact modifier,
   C) from about 0.5 to about 5 parts by weight of a polyolefin having a high density density of greater than 0.940 g/cm³ and a melt flow rate of 0.9 less as measured according to ASTM D1238 at 190° C. using a 2.16 kg weight,
   D) a sufficient amount of a halogen containing flame retardant to provide the composition with 7 to 14 parts by weight halogen, and
   E) from about 2 to about 6 parts by weight of an inorganic flame retardant synergist.

2. The composition of claim 1 wherein the rubber modified polymer is high impact polystyrene.

3. The composition of claim 1 wherein the impact modifier is selected from the group consisting of polybutadiene, polyisoprene, a diblock or triblock copolymer of a vinyl aromatic monomer and a conjugated diene, a copolymer of a vinyl aromatic monomer and a hydrogenated diene, an ethylene-acrylic acid copolymer and an ethylene-styrene copolymer.

4. The composition of claim 3 wherein the impact modifier is a styrene-butadiene-styrene copolymer.

5. The composition of claim 1 wherein the flame retardant is selected from the group consisting of a hexahalodiphenyl ether, a octahalodiphenyl ether, a decahalodiphenyl ether, a decahalobiphenyl ethane, a 1,2-bis(trihalophenoxy)ethane, a 1,2-bis(pentahalophenoxy)ethane, a hexahalocyclododecane, a tetrahalobisphenol-A, an ethylene(N, N')-bis-tetrahalophthalimide, a tetrahalophthalic anhydride, a hexahalobenzene, a halogenated indane, a halogenated phosphate ester, a halogenated paraffin, a halogenated polystyrene, and a polymer of a halogenated bisphenol-A and epichlorohydrin, and mixtures thereof.

6. The composition of claim 5 wherein the flame retardant is a bromine compound.

7. The composition of claim 6 wherein the flame retardant is decabromodiphenyl ether.

8. The composition of claim 6 wherein the flame retardant is a mixture of decabromodiphenyl ether and tetrabromobisphenol-A.

9. The composition of claim 1 wherein the inorganic flame retardant synergist is selected from the group consisting of iron oxide, tin oxide, zinc oxide, aluminum trioxide, alumina, antimony tri- and pentoxide, bismuth oxide, molybdenum trioxide, tungsten trioxide, zinc borate, an antimony silicate, ferrocene and combinations thereof.

10. The composition of claim 9 wherein the inorganic flame retardant synergist is antimony trioxide.

11. The composition of claim 1 wherein the polyolefin is high density polyethylene or polypropylene.

12. The composition of claim 11 wherein the polyolefin is high density polyethylene.

13. A molded article of the composition of claim 1.

* * * * *